(12) United States Patent
Lassota

(10) Patent No.: US 7,648,049 B1
(45) Date of Patent: Jan. 19, 2010

(54) BEVERAGE INGREDIENT MIXING DRINK DISPENSER

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 509 days.

(21) Appl. No.: 11/109,330

(22) Filed: Apr. 19, 2005

(51) Int. Cl.
*B67D 5/56* (2006.01)

(52) U.S. Cl. .................................. 222/129.1; 222/145.6

(58) Field of Classification Search ............... 222/129.1, 222/129.2, 145.6, 129.3–129.5, 236; 366/135, 366/158.1, 196
See application file for complete search history.

(56) References Cited

U.S. PATENT DOCUMENTS 3,938,784 A * 2/1976 Moreton ...................... 366/306
4,193,522 A * 3/1980 Edelbach .................. 222/145.6

FOREIGN PATENT DOCUMENTS

JP    2000-194927    * 7/2000 .............. 222/129.1
JP    2002-326700    * 11/2002 .............. 222/129.1

* cited by examiner

*Primary Examiner*—Lien T Ngo
(74) *Attorney, Agent, or Firm*—James W. Potthast; Potthast & Associates

(57) ABSTRACT

A mixing drink dispenser (10) having a source of water (26) for mixing with a beverage ingredient in a hopper (12) to make a drink having a tooless removable mixing chamber assembly (34) with cylindrical upper body 130 for receipt of beverage ingredient and water and vertical axis, high rotation mixing propellers (36, 180, 182) and a lower section with a slanted bottom (164) joined to and in open fluid communication with the upper section and having a non-closable beverage outlet (148) for free, unobstructed passage of freshly mixed beverage out of the mixing chamber assembly (34) and into a beverage container (46). The propellers (36, 180, 183) are driven by a motor (39) with a drive axle extending through a non-sealed opening in the slanted bottom (164) and removably linked to the propellers via a magnetic linkage (166, 170). An upwardly facing inlet (210) in a domed, splash reflective top (208) is in communication with a tooless removable hopper assembly (12) having a horizontally rotatable feed auger (252) releasably linked to and driven by an external auger drive motor (268). An agitation wheel within the hopper is driven by direct linkage with the auger (252) to stir ingredient within the hopper during operation of the auger.

18 Claims, 9 Drawing Sheets

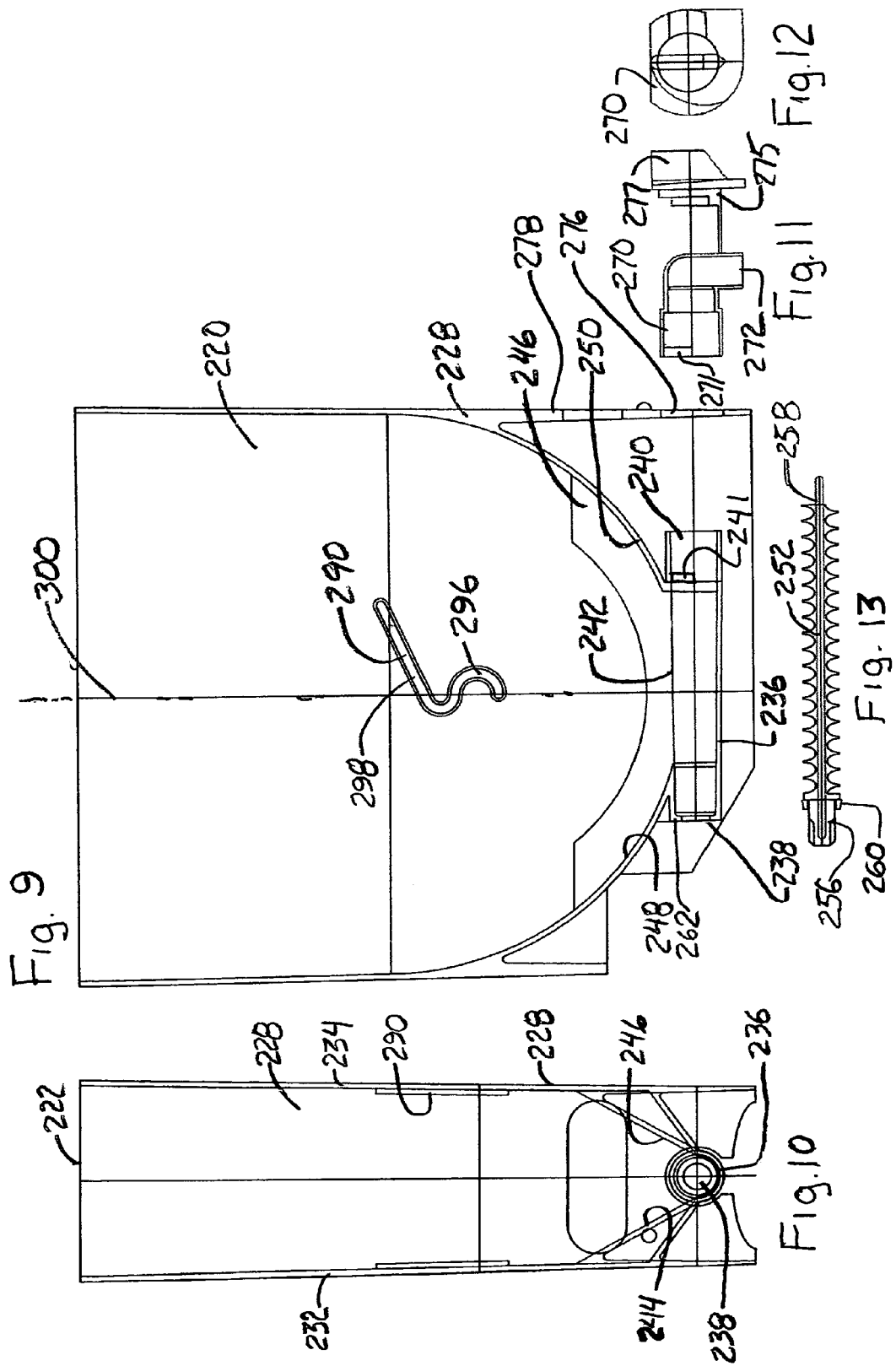

BEVERAGE INGREDIENT MIXING DRINK DISPENSER

CROSS REFERENCE TO RELATED APPLICATION

This application claims the benefit under 35 U.S.C. 120 of U.S. patent application Ser. No. 10/966,502 filed Oct. 15, 2004, which, in turn, claims the benefit under 35 U.S.C. of application Ser. No. 10/217,220, filed Aug. 12, 2002, and entitled "Beverage Powder Mixing Drink Dispenser and Method", now U.S. Pat. No. 6,837,397, which, in turn, claims the benefit under 35 U.S.C. 119(e) of U.S. provisional application Ser. No. 60/316,699, filed Aug. 31, 2001, and also claims the benefit under 35 U.S.C. 119(e) of provisional application No. 60/563,682, filed Apr. 20, 2004, all of the inventor of the present application.

BACKGROUND OF THE INVENTION

1. Field of the Invention

This invention generally relates to beverage mixing dispensers and more particularly to beverage mixing dispensers that mix beverage ingredient, in powder or semi-liquid form, with water to make the beverage.

2. Discussion of the Prior Art

Beverage mixing dispensers that mix beverage ingredient in powder form with water to make a beverage that is then dispensed are well known. Such equipment is often used in beverage vending machines to make such drinks as coffee, tea, cocoa or chocolate drinks, juice, broth, soup, etc. Such mixing dispensers generally comprise a hopper for containing the beverage ingredient, such as beverage ingredient powder or other ingredient material, a mixing chamber with mixing blades for mixing the beverage ingredient with water, a water tank or other source of water for mixing with the beverage ingredient, an ingredient powder delivery system for delivering beverage ingredient powder to the mixing chamber and a solenoid controlled valve for delivering water to the mixing chamber for mixing with the beverage ingredient. The outlet of the mixing chamber has a solenoid controlled valve that is closed during mixing and then opened to drain the mixed drink from the mixing chamber and into a suitable container, such as an individual drinking cup. The powder delivery system may include a solenoid-controlled valve for controlling the outlet of the power hopper for selectively passing powder to the top of the mixing chamber. The amount of water passed to the serving cup is controlled by controlling the time that a water dispense valve is opened, and the amount of powder may be controlled by the length of time that the powder outlet valve is open.

A problem with the known beverage ingredient powder drink dispensers is that due to moisture, steam, water vapor, rising from the mixing chamber, the interior and the exterior of the outlet of the powder hopper often becomes moist. Consequently, powder fines will stick to the powder outlet and eventually clog the outlet such that none or a reduced amount of ingredient powder is dispensed into the mixing chamber. If varying amounts of powder are injected into the mixing chamber without a corresponding proportional varying of the water, the strength of the resultant beverage disadvantageously varies. If the outlet becomes entirely clogged and blocked then the customer gets no beverage for his money put into a vending machine, for instance. Both results are disadvantageous, but the varying and reduced strength, which adversely affects both quality and uniformity, is perhaps the most deleterious. Reduced beverage strength creates a negative impression directly associated with the drink itself as opposed to the dissatisfaction with only the mixing dispenser that is believed to be generally understood by the consumer to not be the fault of the maker of the powder drink ingredient.

Another problem with known beverage mixing dispensers is that the mixing chamber assembly may not be easily disassembled and is not designed to be disassembled or separated from the housing, or body, of the dispenser except by trained service personnel. It is not removable by regular, user employees who have neither the tools nor the technical expertise to disassemble the mixing chamber for purposes of visual and manual access or cleaning. Instead, skilled maintainers of the dispensers may, for instance, visit a vending dispenser on a daily basis, or other periodic longer time periodic basis depending upon the level of usage. Consequently, parts of the mixing chamber do no get cleaned as frequently as they should, resulting in deleterious affects to the taste and quality or even possibly the health safety of the drinks being mixed. Alternatively, the task of frequent, such as daily, regular cleaning of the mixing chamber assembly, can become prohibitively labor intensive and expensive.

Another problem with known mixing drink dispensers is that the air is entrained by cutting large bubbles of air into small one by whipping. This results in a beverage, such as a cappuccino with relatively large bubbles that provides a foam that is relatively unstable and undesirably rapidly subsides or flattens.

SUMMARY OF THE INVENTION

It is therefore an objective of the invention to provide a beverage mixing drink dispenser and method that ameliorates if not overcomes some or all of the problems and disadvantages of the known powder mixing drink dispensers and methods noted above.

This objective is achieved in part by providing a mixing drink dispenser having a source of water for mixing with a beverage ingredient to make a drink, the improvement being a mixing assembly, with a mixing chamber assembly having a mixing chamber with an upper section for receipt of beverage ingredient and water and a lower section joined to and in open fluid communication with the upper section, the upper section having an open top for receipt of beverage ingredient and a water inlet for receipt of water from the source, the lower section having a bottom with a non-closable beverage outlet in the bottom for free, unobstructed passage of freshly mixed beverage out of the mixing chamber to a beverage container, and a mixing propeller assembly with a plurality of mixing propellers located in the lower section intermediate the upper section and the non-closable beverage outlet for completely mixing together the beverage ingredient and water received at the upper section before falling to bottom and the non-closable beverage outlet and passage out of the mixing chamber.

Also, achievement of the objective of the invention is obtained by providing a mixing drink dispenser having a frame, source of water, a hopper for storing a supply of beverage ingredient, means for feeding selected amounts of beverage ingredient and water together for mixing, with a mixing chamber assembly, having an electrical drive motor with an elongate, rotary drive shaft, means for fixedly mounting to the frame the electrical drive motor in a fixed position with the elongate drive shaft extending in an upward direction, a mixing chamber with a bottom and an upwardly standing boss with an axial cylindrical bore extending through the boss for sliding receipt of the drive shaft, a connector fitting having a body with a downwardly facing female connector cavity within which both an upper part of the drive shaft extending above the boss and an upper part of the boss are protectively received to block the entry of beverage, water or beverage ingredient into the bore, and a top with a propeller connector, a propeller assembly with at least one propeller and an underlying connector for mating receipt and tool-les connection with the propeller connector for mounting the propeller assembly on the top of the connector fitting for rotation with the connector fitting and the rotary drive shaft.

Yet, the objective is acquired in part by providing a mixing drink dispenser having a frame, source of water, a hopper for storing a supply of beverage ingredient, means for feeding selected amounts of beverage ingredient and water together for mixing, with a mixing chamber assembly having an electrical drive motor with an elongate, rotary drive shaft, means for fixedly mounting to the frame the electrical drive motor in a fixed position with the elongate drive shaft extending in an upward direction, a mixing chamber with a bottom and an upwardly standing boss with an axial cylindrical bore extending through the boss for receipt of the drive shaft, a connector fitting having a body with an underlying connector for connection with a part of the drive shaft extending above the boss, and a top with a propeller connector made in part of an magnetic element, a propeller assembly made with at least one propeller, and an underlying connector for mating receipt and tool-les connection with the propeller connector for mounting the propeller assembly on the top of the connector fitting for rotation with the connector fitting and the motor drive shaft, said underlying connector of the propeller assembly having another magnetic element that is magnetically attached to the one magnetic element of the propeller connector for releasable tool-les connection of the propeller assembly to the connector fitting.

The objective of the invention is also acquired in part by provision of a mixing drink dispenser having a frame, source of water, a hopper for storing a supply of beverage ingredient, means for feeding selected amounts of beverage ingredient and water together for mixing, with a mixing chamber assembly having a mixing chamber body with an upper cylindrical section with an open top for receipt of beverage ingredient and a cylindrical interior side with a water inlet for connection of the upper section with the source of water, a lower cylindrical section with a central axis of symmetry connected to and in free fluid communication with the upper section, said lower section having an interior cylindrical surface substantially continuous with the cylindrical interior side and fixed mixing members spaced around and extending inwardly from the interior cylindrical surface, a bottom with a beverage outlet located beneath the lower cylindrical section, and a propeller assembly mounted for rotation within the lower cylindrical section around an axis that is substantially parallel to the central axis of symmetry of the lower cylindrical section and having at least one radially extending mixing propeller that extends outwardly to adjacent the inwardly extending fixed mixing members.

Partial achievement of the invention is also obtained by providing a mixing drink dispenser having a frame, source of water, a hopper for storing a supply of beverage ingredient, means for feeding selected amounts of beverage ingredient and water together for mixing, with a mixing chamber assembly having a mixing chamber body with an upper cylindrical section with an open top and a cylindrical side with a water inlet for connection of the upper section with the source of water, a lower cylindrical section with a central axis of symmetry connected to and in free fluid communication with the upper section, said lower section having an interior cylindrical surface substantially continuous with the cylindrical interior side, a bottom with a beverage outlet located beneath the lower cylindrical section, and a propeller assembly mounted for rotation within the lower cylindrical section around an axis that is substantially parallel to the central axis of symmetry of the lower cylindrical section and having at least one radially extending, peripheral, mixing propeller and a central pre-mixing member aligned with the central axis of symmetry, said central pre-mixing member being located above the at least one radially extending mixing propeller and directly laterally opposite at least a portion of the water inlet.

Additionally, the objective is achieved by providing a mixing drink dispenser having a frame, source of water, a hopper for storing a supply of beverage ingredient, means for feeding selected amounts of beverage ingredient and water together for mixing, with a mixing chamber assembly having a mixing chamber body with an upper cylindrical section with an open top and a cylindrical side with a water inlet for connection of the upper section with the source of water, a lower cylindrical section with a central axis of symmetry connected to and in free fluid communication with the upper section, said lower section having an interior cylindrical surface substantially continuous with the cylindrical interior side, a bottom with a beverage outlet located beneath the lower cylindrical section, a propeller assembly mounted for rotation within the lower cylindrical section around an axis that is substantially parallel to the central axis of symmetry of the lower cylindrical section and having at least one radially extending, peripheral, mixing propeller, and a cover with a downwardly facing concave interior surface and a central ingredient inlet opening for receipt of beverage ingredient mounted to the upper section and above the mixing propeller to reflect downwardly and inwardly any upwardly directed splashes from the propeller assembly or the water inlet.

Also, the objective is satisfied in part by providing a mixing drink dispenser having a frame, source of water, a hopper for storing a supply of beverage ingredient, means for feeding selected amounts of beverage ingredient and water together for mixing, with a mixing chamber assembly having a mixing chamber body with an upper cylindrical section with an open top and a cylindrical side with a water inlet for connection of the upper section with the source of water, a lower cylindrical section with a central axis of symmetry connected to and in free fluid communication with the upper section, said lower section having an interior cylindrical surface substantially continuous with the cylindrical interior side, and a bottom with an upwardly facing surface that slopes downwardly from the lower cylindrical section to drain beverage to a beverage outlet located adjacent a front of the mixing chamber, a propeller assembly mounted for rotation within the lower cylindrical section around an axis that is substantially parallel to the central axis of symmetry of the lower cylindrical section and having at least one radially extending, peripheral, mixing propeller, and an electric motor for providing rotary drive to the propeller assembly.

Partly acquiring the objective of the invention is partly obtained by providing a mixing drink dispenser having a frame, source of water, a hopper for storing a supply of beverage ingredient, means for feeding selected amounts of beverage ingredient and water together for mixing, with a mixing chamber assembly having a mixing chamber body with an upper section for receipt of beverage ingredient and water, a lower mixing section, a bottom and means carried by the body for releasably mounting the chamber body to the frame, a motor fixedly mounted to the frame and located outside of the mixing chamber body, a propeller assembly for rotation within the lower section, and means for releasably linking the drive motor through the chamber body to the propeller assembly to rotate the propeller assembly when the motor is energized.

Part obtainment of the invention is also achieved by providing a mixing drink dispenser having a frame, a source of water, a mixing chamber assembly with a mixing chamber body with a rotary propeller, means for selectively feeding water into the mixing chamber for mixing with a beverage ingredient, with a hopper assembly for feeding selected amounts of beverage ingredient to the mixing chamber and having a hopper body with an open top for receipt of a supply of beverage ingredient and a bottom, means carried by the hopper body for releasable mating support of the hopper body in an operative position by a mating portion of the frame, a drive motor fixedly mounted to the frame, a conveyor tube assembly, including a tubular body mounted to the bottom and having an upwardly facing inlet opening in communication with the hopper body for receipt of beverage ingredient from within the hopper body, and an outlet at an end of the tube laterally spaced from the inlet opening an elongate ingredient feed auger within the tubular body for rotation to move ingredient received into the tubular body through the inlet opening to the outlet for passage into the mixing chamber, and means for releasably linking the drive motor to the elongate ingredient feed auger to selectively rotate the feed auger.

Moreover, the objective is achieved by provision of a mixing drink dispenser having a frame, a source of water, a mixing chamber assembly with a mixing chamber body with a rotary propeller, means for selectively feeding water into the mixing chamber for mixing with a beverage ingredient, with a hopper assembly for feeding selected amounts of beverage ingredient to the mixing chamber, having a hopper body with an open top and a bottom, a laterally extending conveyor tube mounted to the bottom and having an upwardly facing inlet opening for receipt of ingredient into the conveyor tube and an outlet opening at a distal end of the tube laterally spaced from the inlet opening, a rotatably driven feed auger mounted for rotation within the conveyor tube for conveying ingredient from the inlet opening to the outlet opening, an agitator member mounted for stirring movement through ingredient within the hopper body, and means for linking the rotatably driven feed auger to the agitator member to drive the agitator member into stirring movement by rotation of the rotatably driven feed auger.

Additionally, the objective is partly acquired by providing a mixing drink dispenser having a frame, source of water, a mixing chamber assembly with a mixing chamber body with a rotary propeller, means for selectively feeding water into the mixing chamber for mixing with a beverage ingredient, with a hopper assembly for feeding selected amounts of beverage ingredient to the mixing chamber having a hopper body with an open top for receipt of beverage ingredient and an outlet, means for selectively moving ingredient from the outlet to the mixing chamber body, an agitation wheel with at least one stirring member for stirring beverage ingredient in the hopper body, means carried within the hopper body for releasably mounting the agitation wheel for rotation within the hopper body about a generally horizontal axis, and a source of drive power; and means for selectively connecting the source of drive power to the agitation wheel to rotate the agitation wheel.

In addition, the partial achievement of the invention is obtained by providing a mixing drink dispenser having a frame, source of water, a mixing chamber assembly with a mixing chamber body with a rotary propeller, means for selectively feeding water into the mixing chamber for mixing with a beverage ingredient, with a hopper assembly for feeding selected amounts of beverage ingredient to the mixing chamber, having a hopper body with an open top for receipt of beverage ingredient, a bottom, two pairs of opposite side walls extending between the open top and the bottom, and an outlet, means for selectively moving ingredient from the outlet to the mixing chamber body, an agitation wheel with a center, a fixed axle extending outwardly from the center on opposite sides of the wheel, means carried within the hopper body and extending inwardly from both of one of the two pairs of opposite sides for releasably mounting the axle for rotation within the hopper body about a generally horizontal axis, at least two stirring members spaced from the center and extending outwardly from opposite sides of the wheel, said stirring members functioning to pass through the beverage ingredient during rotation of the wheel and to provide lateral support to maintain the agitation wheel in an upright position with the axle releasably engaged with the axle mounting means, a source of drive power, and means for selectively applying drive to the agitation wheel to rotate the agitation wheel and the stirring members.

Acquisition of the objective, in part, is acquired by providing a mixing drink dispenser having a frame, a source of water, a mixing chamber assembly with a mixing chamber body with a rotary propeller, means for selectively feeding water into the mixing chamber for mixing with a beverage ingredient, with a hopper assembly for feeding selected amounts of beverage ingredient to the mixing chamber, having a hopper body with an open top and a bottom, a laterally extending feed auger conveyor tube mounted to the bottom and having an upwardly facing ingredient inlet opening for receipt of beverage ingredient from the hopper body and a laterally, a distal end outwardly facing outlet, a down spout having one tubular arm with an inlet end for receipt of ingredient from the outwardly facing outlet of the conveyor tube and another tubular arm connected to, and extending transversely from, the one tubular arm and having an outlet end, said one tubular arm being mounted to the distal end of the conveyor tube for rotation between an operative feed position in which the outlet end is beneath the one tubular arm and is facing downwardly to pass ingredient downwardly to the mixing chamber, and an inoperative removal position in which the outlet end is above the one tubular arm and is facing upwardly to prevent downward spilling of ingredient during removal of the hopper body from the frame.

Part achievement of the objective of the present invention is also acquired by providing a mixing drink dispenser having a frame, a source of water, a mixing chamber assembly with a mixing chamber body with a rotary propeller, means for selectively feeding water into the mixing chamber for mixing with a beverage ingredient, with a hopper assembly for feeding selected amounts of beverage ingredient to the mixing chamber, having a hopper body with an open top and a bottom, means carried by the bottom for selectively passing ingredient from the hopper to the mixing chamber, means for releasably supporting the hopper body in an operative position within the frame, and means mounted to the frame for selectively manually locking the hopper body in the operative position against removal and unlocking the hopper body to enable manually removal of the hopper body from within the frame by merely lifting of the hopper body out of the frame after being unlocked.

BRIEF DESCRIPTION OF THE DRAWINGS

The foregoing advantageous features will be illustrated in detail and other advantageous features will be made apparent from the detailed description of an embodiment of the beverage powder mixing drink dispenser of the present invention which is given with reference to the several views of the drawings, in which:

FIG. 9 is a section side view of the hopper frame without the motor or outlet couplings attached;

FIG. 10 is a back view the hopper assembly of FIG. 10;

FIG. 11 is an outlet coupling of redirecting the ingredient into a downward direction toward the open top of the mixing chamber;

FIG. 12 is an end view of the outlet coupling that fits on the outlet end of the conveyor section of the hopper assembly of FIG. 11;

FIG. 13 is a side view of the screw of the screw conveyor of the hopper assembly of FIG. 8 and which is received within the conveyor section of the hopper assembly;

DETAILED DESCRIPTION

Figure 1:
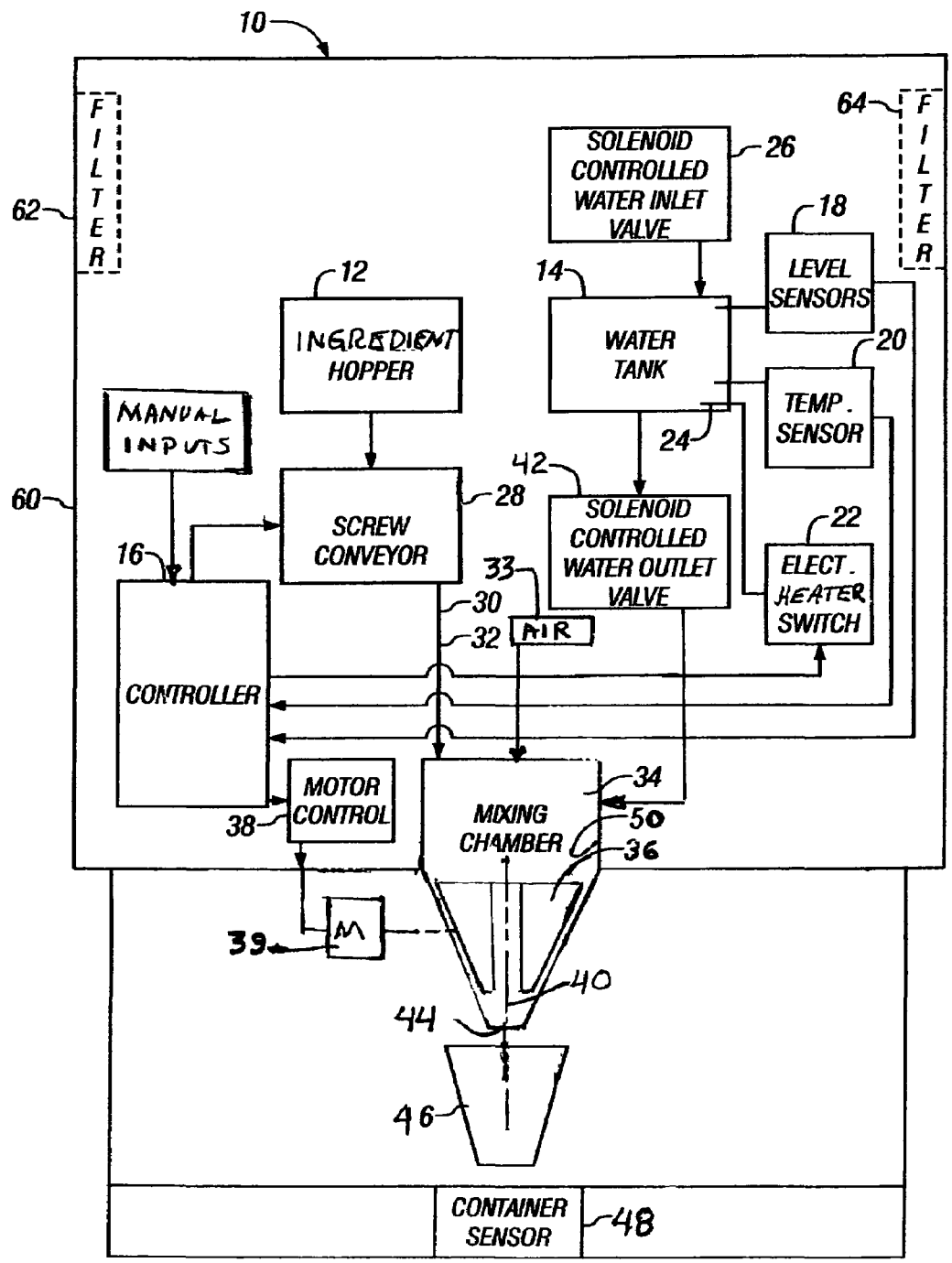
FIG. 1 is a functional block diagram of an embodiment of the beverage ingredient mixing drink dispenser of the present invention.

Referring to FIG. 1, the preferred embodiment of the beverage ingredient mixing drink dispenser 10 has at least one hopper 12 for containing a supply of dry beverage ingredient powder, a source of mixing water in a water tank 14 and a controller 16. Level sensors 18 detect the level of the water in the water tank 14. If the water level drops beneath a preselected minimum level, then the controller 16 actuates a solenoid controlled water inlet valve 26 that is connected to a public source of water through a hose (not shown) to add fresh water to the water tank 14. When the water level rises above another preselected level stored in the controller memory, the controller 16 deactuates the solenoid-controlled valve 26 to stop the addition of new water to the water tank 14.

In the case of a hot beverage dispenser, a temperature sensor 20 senses the temperature of the water in the tank 14 and provides the sensed temperature to the controller 16. When the detected temperature decreases beneath a preselected minimum temperature stored in the controller memory, then the controller 16 actuates an electrical temperature control switch 22 to provide electrical power to an electrical heating element or cooling element 24 to increase the temperature of the water. When the temperature rises above another preselected maximum temperature, then the controller deactuates the switch 22 to de-energized the heating element (or cooling element) 24 and allow the water to cool (or warm)

The beverage ingredient such as instant coffee, instant tea, dried soup, dried fruit drink mix, powdered drink mix, or semi-liquid or liquid concentrate, such as tea concentrate, fruit juice concentrate, or the like, is contained within the ingredient hopper 12. When it is time to make a drink, i.e. when a drink selection switch has been actuated, the controller 16 actuates a drive motor 39 to rotate an auger of a screw conveyor 28. When actuated, the screw conveyor 28 conveys a preselected quantity of ingredient at a preselected rate from the bottom of the hopper 12 to an inlet 30 of a drop chute 32. The conveyed ingredient falls through the drop chute 32 and into the inlet opening of a mixing chamber assembly 34. Atmospheric air 33 is received within the mixing chamber assembly 34.

The mixing chamber 34 has a plurality of rotary mixing members 36 that are driven by a motor 39 under control of a motor control 38 to rotate around an axis 38 at high speed. As will be explained, in reference to subsequent figures, the interior of the mixing chamber has a non-smooth surface preferably provided by a plurality of inwardly extending corrugations, scallops, or the like, that interact with the mixing members to enhance turbulent mixing.

At the same time the powder or other beverage ingredient is added to the mixing chamber 34, a solenoid controlled water outlet valve 42 is actuated by the controller 16 to add a preselected quantity of water from the water tank 14 to the inlet of the mixing chamber 34 at a preselected rate. In the case of a hot beverage, the water tank of course contains hot water, but in the case of other drinks the water may be cooled or at ambient temperature. Concurrently, the controller 16 actuates the motor control circuit, or motor control, 38 that, in turn, energizes the variable speed motor 39. The variable speed motor 40 rotates the mixing members 36 at relatively high speed to mix the ingredient with the water. The mixing chamber 34 has a hollow body with an interior surface 50 having an upper section with a generally cylindrical surface and a lower section with an inwardly tapered surface extending downwardly to a relatively narrow chamber outlet 44. The mixing members 36 extend radially outwardly from the rotational central axis 40 to adjacent the interior surface 50 of the mixing chamber 34.

The mixing members 36 are preferably in the form of relatively thin-walled vanes, or other blade like members, that extend in a generally vertical direction but they also may have an upper slanted wing for funneling the powder downwardly and inwardly to the vertical portion of the mixing members or have an overall slant relative to the vertical axis 40.

During rotation of the auger of the screw conveyor 28, the solenoid controlled water outlet valve 42 is controlled by the controller 16 to selectively pass dry ingredient powder and mixing water into the mixing chamber 34 to be blended together in the mixing chamber 34 during rotation of the mixing members 36 at a relatively high mixing speed. The axle of rotation is aligned with the center axis 40. Preferably, the motor 38 is a DC motor with a maximum output shaft speed of approximately 20,000 rpm but which is operated at a speed of approximately 4000-8000 rpm.

As will be explained in greater detail below and as generally noted above, at least a lower part of each of the substantially identical mixing members 36 has a generally vertical directional component for engaging the powder, etc. and water within the interior of the hollow body 48, for mixing them together preferably by a process akin to melding. Mixing motion to the mixture is also imparted to the mixture by the relatively roughened, stationary, interior surface 50 of the mixing chamber 34 that facilitates blending of all the beverage ingredients including the water and air that is added.

As the powder, or other type of concentrated ingredient, and water ingredient fall into the mixing chamber 34 during rotation of the mixing members 36 and pass-through, a cover over the top of the mixing chamber. The cover functions to reflects any arrant powder or other ingredient or other water or the mixed beverage inwardly toward the central axis 40 and downwardly through the hollow body of the mixing chamber 34 while atmospheric air 33 is drawn into the chamber 34 to both cool and enhance intermixture of the ingredients with air flow. Once mixed, the drink falls through the chamber outlet 44 at the bottom of the hollow body 48. The mixed drink falls into a serving container, such as a paper cup, 46. A container sensor 48 senses if a container is present, and the controller 16 inhibits drink mixing if no container 48 is sensed at the container position With this structure and propeller speed, in the case of making cappuccino from a cappuccino powder mix, the water, the ingredient powder, and air are all mixed together to create froth on top of the cappuccino beverage that is dispensed. Preferably, any steam present due to the presence of hot water is passed though the mixing chamber and out of the dispense outlet and away from the interior of the housing. The ratio of mix cappuccino powder mix to hot water is in the range of 4:1 to 20:1 and is preferably approximately 12:1. The cappuccino powder is generally composed of ½ to ⅓ sugar (cane, beet or corn syrup solids); ½ to ⅓ creamer (commercial products like Coffee Mate®, diary mix or whey solids); and ⅓ to trace amounts of vegetable gum, cocoa, instant or freeze dry coffee and flavoring.

The propeller blades are operated at high speed for approximately one second per ounce of beverage to be made. During the high speed mixing a vortex is created that draws air into the mixing chamber 34 that is entrained into the mixture to create a high volume of very small air pockets or bubbles that compose approximately ¼ to ⅓ of the total volume of the final drink. Known dispensers have a horizontally arranged mixing chamber, with a horizontal axis of rotation for the mixing propellers or lack propellers extending to adjacent stationary mixing rigs. Unlike these known mixing dispensers, in the vertical array of the present invention, the air and water cascade is used to move the product and there is no pumping action from the propellers 36 to move the product. Instead of a continuous solution and mixture flow being created, in the present invention, a blotchy continuous flow is obtained in which the ingredient and the water travel in a stream of air along the interior sides of the mixing chamber. Because the product and water flow around the mixing chamber while being pressed against the side, the mixing action is much like a rubbing action such as obtained in a mortar, instead of a slicing action, i.e. the ingredient is virtually "rubbed" into solution. This creates very low or no shearing forces.

In known mixing dispensers the ingredient and the water and air are all in contact and then agitated by the propeller that creates moderate to high shear. Unlike the present invention in which the air is entrained by folding in air associated with surface irregularities, in known mixers the air is entrained into the beverage by cutting large bubbles of air into small one by a whipping action. Consequently, in known mixers a beverage is created which has relatively larger, coarser bubbles that provide a relatively unstable foam. On the other hand, due to the folding of air into the beverage in the mixing dispenser of the present invention, a foamed beverage is created with a foam constructed of many relatively tiny bubbles that is relatively more stable. Instead of obtaining a relatively good dispersion of fine material in the powdered ingredient, there is relatively poor mixing of fluffy particles and fine particles can be balled together and surrounded by air bubbles and passed through un-mixed although relatively large particles are cut into solution.

Figure 2:
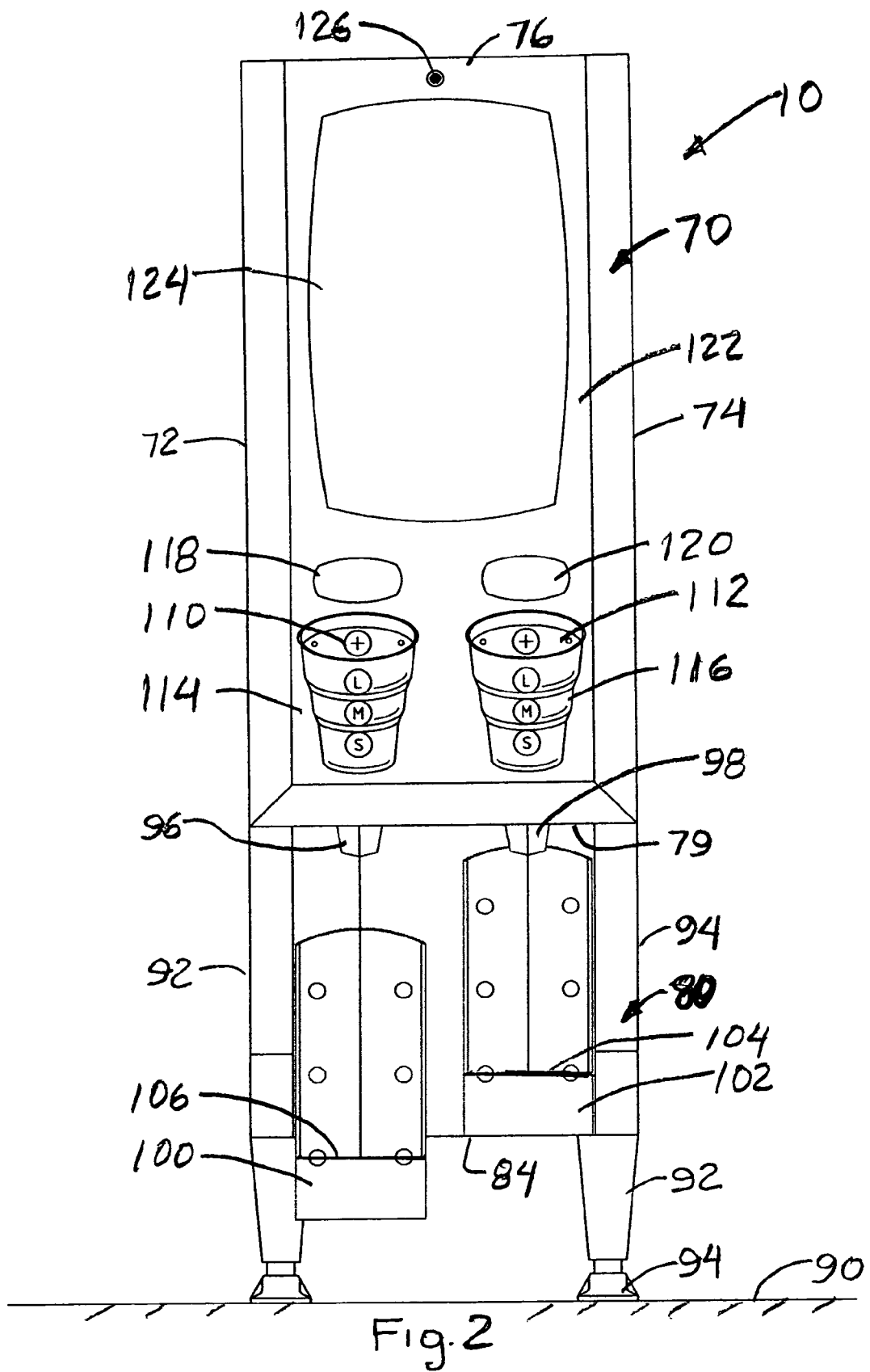
FIG. 2 is a front elevation of a preferred embodiment of the drink dispenser of FIG. 1.
Figure 3:
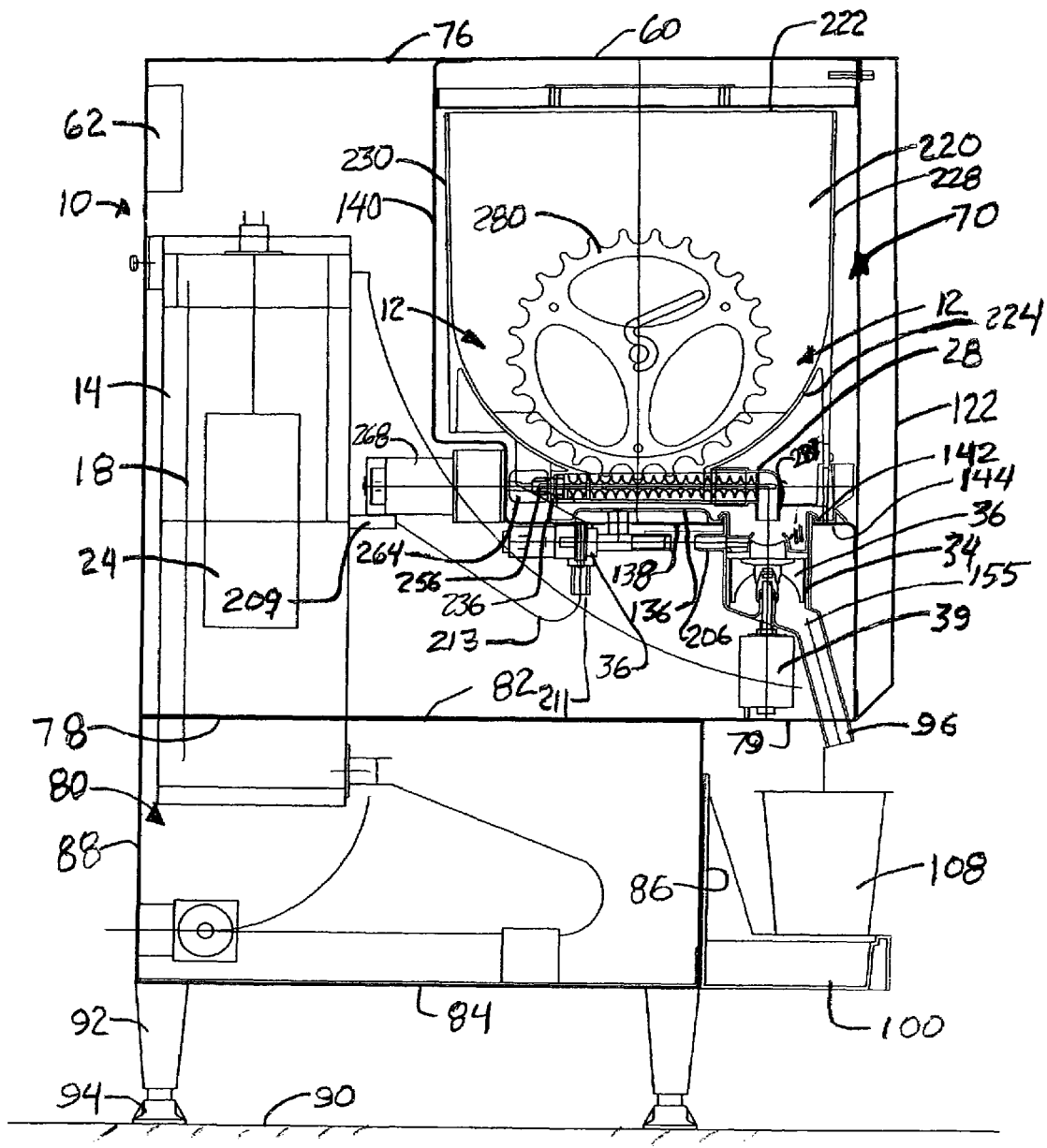
FIG. 3 is a sectional left side view of the ingredient mixing drink dispenser of FIG. 2.

Referring to FIG. 2, a front view of the preferred embodiment of the beverage ingredient mixing dispenser 10 is seen to have an upper-housing 70 with a pair of opposite left side 72 and right side 74 extending between a top 76 and a bottom 78. The bottom 78 is supported by a sub-housing 80. Referring to FIG. 3, the sub-housing has a top 82, a bottom 84, a left side wall, a front wall 86 and a back wall 84 that aligns with a back wall 90 of the upper-housing 70 and a pair of opposite left and right side walls 92 and 94, FIG. 2.

Still referring to FIGS. 2 and 3, the bottom 84 of the of the lower housing has a generally rectilinear shape and is supported above a counter top 90 or other support surface by four substantially identical corner legs 92. The corner legs 92, in turn, are supported by level adjustment feet 94 that are threadably attached to the bottoms of the corner legs 92. The lower housing 80 has a depth less than that of the of the upper housing 70, and an exposed, downwardly facing forward portion 79 of the bottom 78 of the upper housing 70 extends in cantilever fashion forwardly of the front wall 86 of the lower housing 80. Extending downwardly from openings in the forward portion 79 is a pair of nozzles 96 and 98 from which the freshly made drinks are dispensed at left and right dispense positions. Adjustably mounted to the front 86 of the lower housing are a pair of drip tray assemblies, or sink assemblies, 100 and 102 with upper cup support surfaces 104 and 106, respectively, for supporting a cup beneath the left and right dispense positions, respectively. In keeping with one aspect of the invention, the vertical position of the drip tray assemblies 100 and 102 are adjustable to accommodate serving cups 108, FIG. 3, of different size.

The control system has a pair of toggle switches 110 and 112 for selecting one of a plurality of different sized drinks. There are icons of three different sizes, L for large, M for medium and S for small that have associated back lights to display the icon that is selected. Each time the toggle switch is actuated, the selection moves from the one previously selected to the next selection in the cycle. One set of icons 114 is provided for the left dispensing position and another set 116 is provided for the right dispensing position. After the icon of the desired size has been selected and is displayed to the user, actuation of a start switch 118 or 120 causes the controller 16 to take appropriate action needed to make a drink of the desired size and dispense the drink from the left nozzle 96 or the right nozzle 98, respectively.

The front 122 of the upper housing 70 has a backlit translucent screen 124 upon which advertising graphic are displayed. At the top of the front 22 is mounted an emergency stop switch actuator 126 to terminate all dispensing from either dispense position in the event of an operational failure or other emergency.

Referring to FIG. 1 again, it should be appreciated that the two dispense positions of dispense nozzles 96 and 98 of FIG. 2 each have an associated set of hardware including the hopper 12, the screw conveyor 28, the mixing chamber 34 and associated mixing members 36, the motor control 38, and the solenoid controlled water outlet valve 42. On the other hand, they either share, or be individually provided with, the water tank 14 and the associated level sensors 18, the temperature sensor 20 and the electrical temperature switch 22 and associated heating element or cooling element 24. Similarly, they may share or each be provided with their own controller 16.

Although not shown, they preferably share, but may each have separate D.C. power supplies for the controller and do share a AC power inlet. They preferably have different power supplies for the DC motor and of course, the DC motors are independently controlled. One side could be for cold drinks while the other side could be used for hot drinks, or both could be for either cold or hot drinks.

In the following description of the details of the preferred embodiment given with reference to FIGS. 3-15, for purposes of simplicity, only the left side of the drink ingredient mixing beverage dispenser 10 of FIGS. 1-2 will be described. It should be understood that the side of the dispenser associated with the right side drink dispense nozzle 98 operates in the identical fashion and has the same mechanical and other elements as the left side drink dispenser, or which elements may be shared, in part, as indicated above. Also, the dispenser 10 will be described with reference to making a hot beverage such as a cappuccino with a powdered beverage ingredient that is mixed with hot water, but it should be understood that the beverage could also be made from a semi-liquid beverage ingredient, such as a syrup, that is mixed with either hot or cold water.

Figure 7:
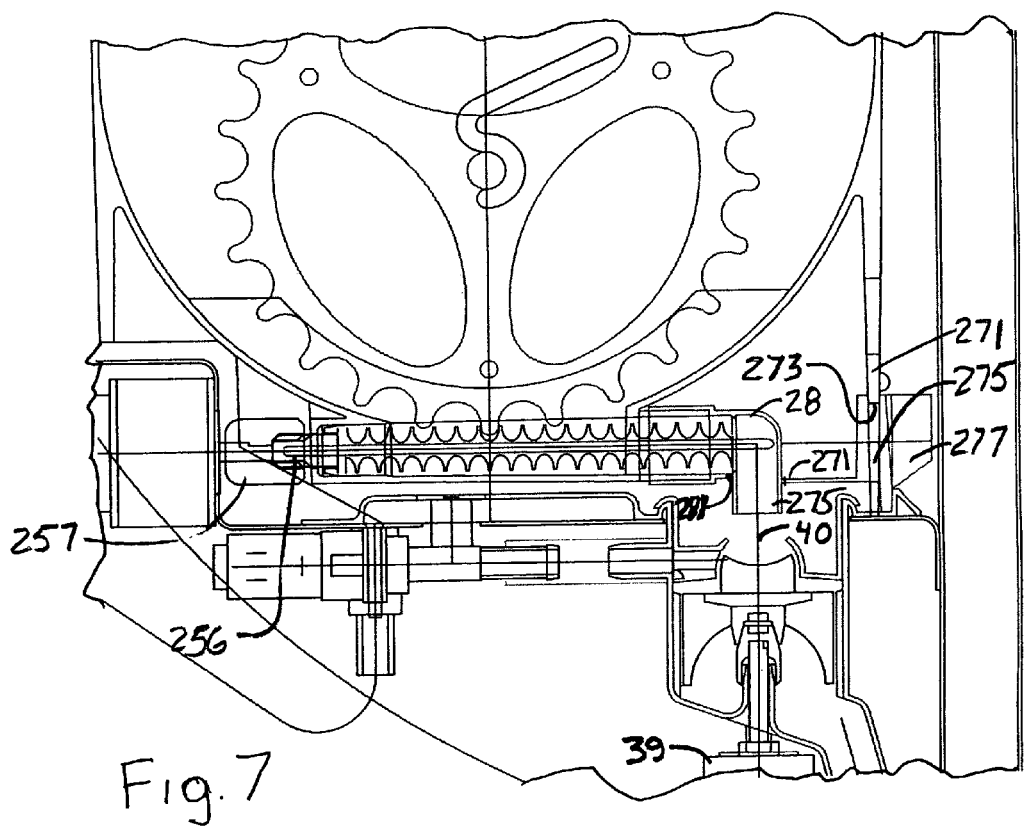
FIG. 7 is an enlarged view of a portion of the side section view of FIG. 3 in which the hopper assembly is shown in association with the mixing chamber assembly of FIGS. 4, 5 and 6.
Figure 8:
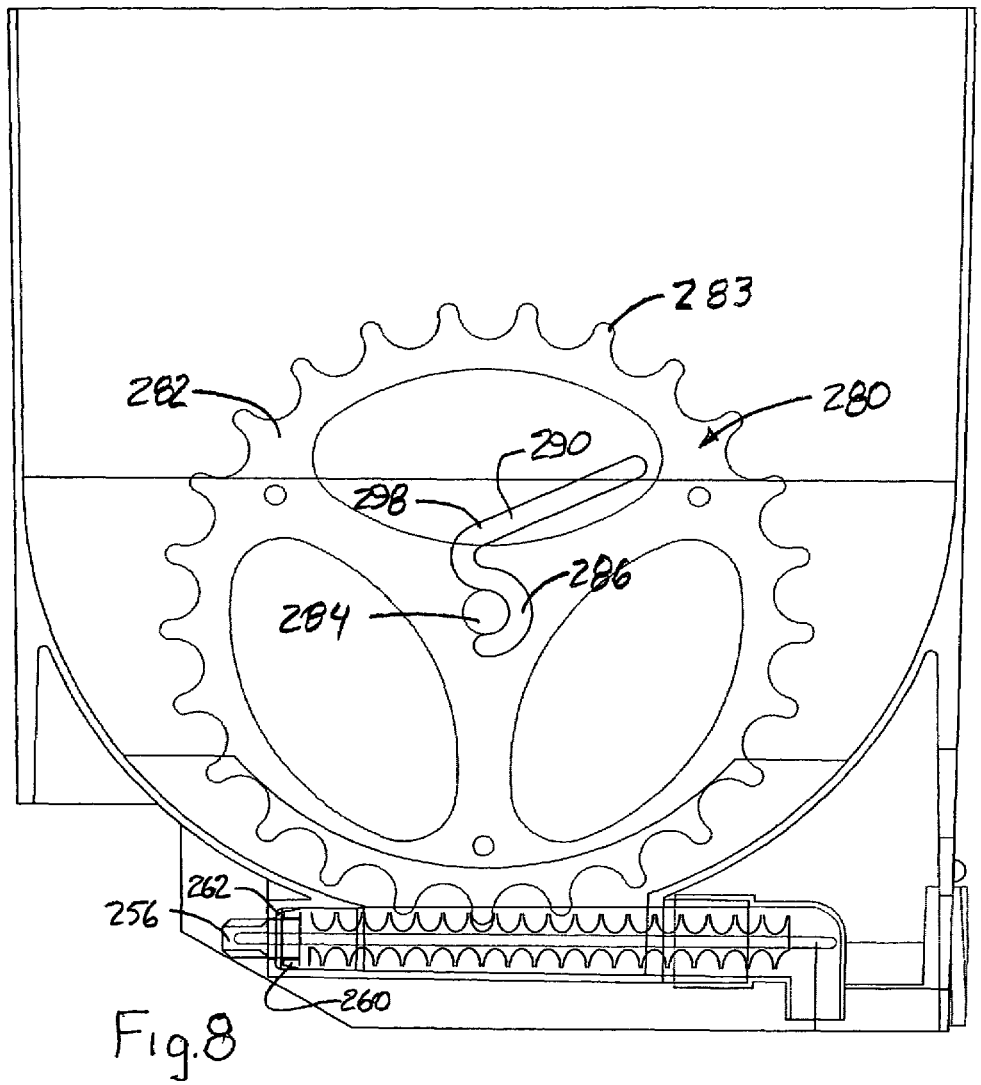
FIG. 8 is an enlarged portion of the section side view of FIG. 7 showing only the hopper assembly.

As will be explained before, an important advantage of the dispenser 10 is that simply by changing the shaft the dispenser 10 may be adapted from either dispensing powder from the hopper 12 or semi-liquid ingredient. In the case of powder, the shaft is as shown in FIGS. 7, 8 and 13. In the case of a semi-liquid ingredient, the auger 252 is provided with threads that are relatively deeper and a pitch having a greater angle than that of the auger 252 to provide more space between adjacent threads. In addition, the ends of the threads may be coated with or formed from a resilient material that can be pressed against the inside of the conveyor tube 236 to resiliently press against the inside surface of the conveyor tube to create a liquid seal. Advantageously, this change of augers can be easily made without tools and without any other changes.

Figure 4:
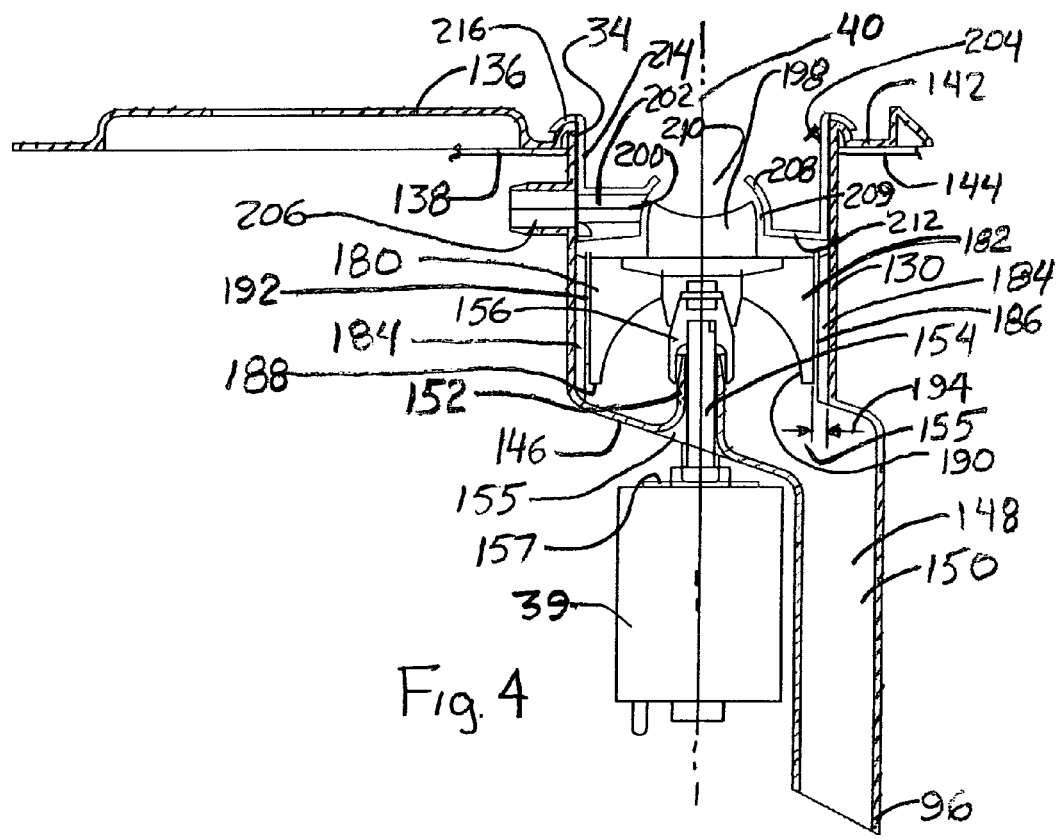
FIG. 4 is an enlarged side section view of the mixing chamber assembly shown in FIG. 3.
Figure 5:
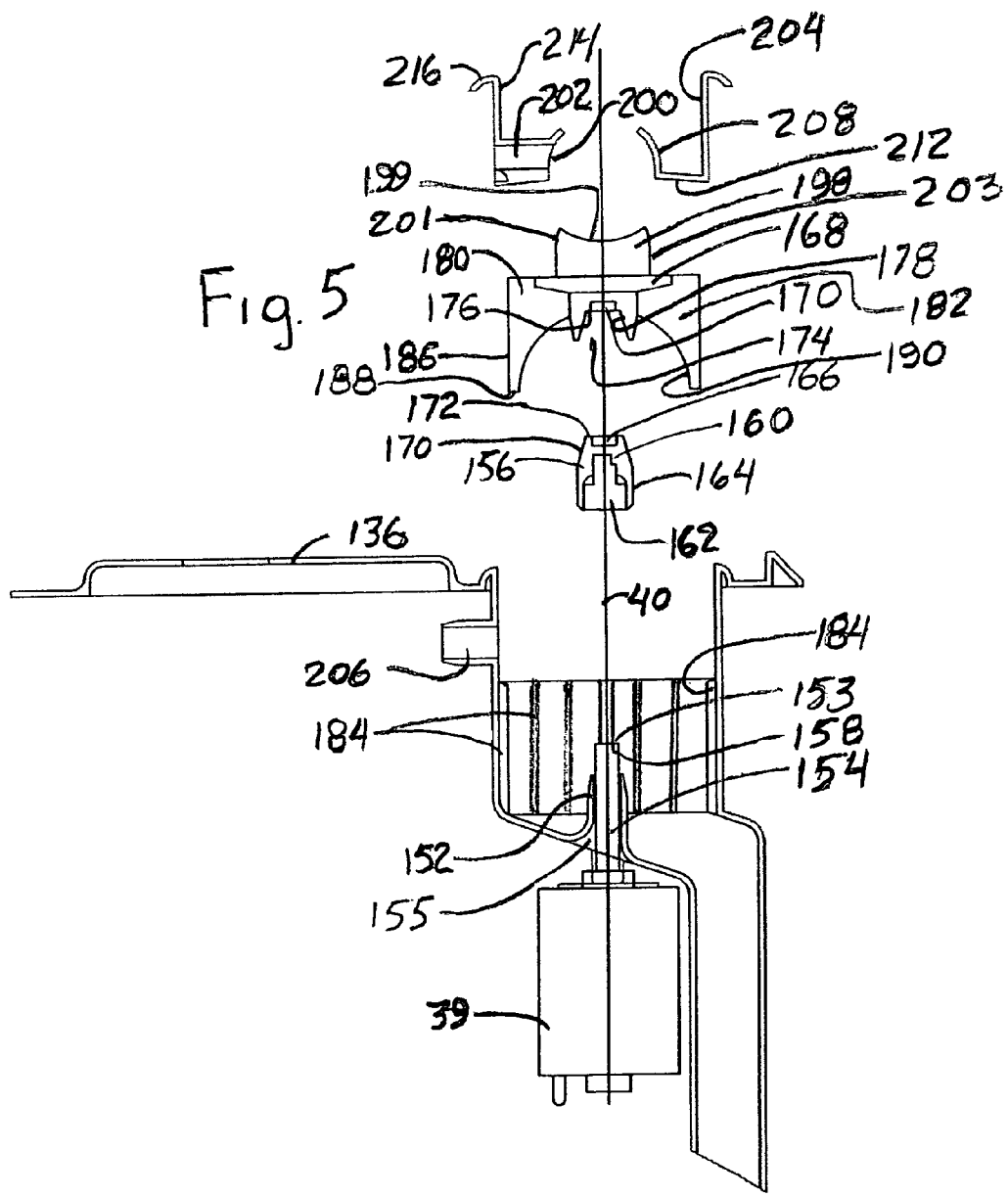
FIG. 5 is an exploded side section view of the mixing chamber assembly of FIG. 4.

Referring now to FIGS. 3, 4 and 5 in detail, in keeping with an aspect of the invention, the mixing chamber assembly 34 is mounted for easy tooless removal to facilitate cleaning and maintenance. In the preferred embodiment of the dispenser 10, the mixing chamber, or mixing chamber assembly, 34 has a cylindrical upper body 130 with a center axis 132 and a circular open top 134 for receipt of beverage ingredient from the ingredient hopper 12. A rear mounting member 136 is located adjacent the open top 132 and extends radially outwardly and rearwardly from the cylindrical side of the upper body 130 in a plane that is generally perpendicular to the axis. The rear mounting member 136 is supported by a rear bottom section of an internal support frame 140, FIG. 3 that is fixedly secured to the upper housing 70. A forward mounting member 142 is located adjacent the open top 132 and extends generally radially and forwardly in a direction opposite to that of the rear mounting member 136. The forward mounting member 142 is supported by a forward bottom section 144 of the internal support frame 140. Thus, the cylindrical upper body 130 of the mixing chamber assembly 34 is slidably received within a conforming opening in the bottom of the internal support frame located between the rearward bottom section 138 and the forward bottom section 144 and is only suspended from the internal support frame 140 by the outwardly extending mounting members 136 and 142.

The bottom 146 of the body of the mixing chamber 34 is generally planer and slopes downwardly in a forward direction toward an outlet opening 148 that feeds into a downwardly extending dispense tube 150 the end of which defines the dispense nozzle 96. The outlet opening 148 faces in a generally lateral direction and is located adjacent the front of the cylindrical body 130. The dispense tube 150 may extend straight down in a generally vertical direction, as shown in FIG. 4, or may be slanted forwardly, as shown in FIG. 3.

Figure 6:
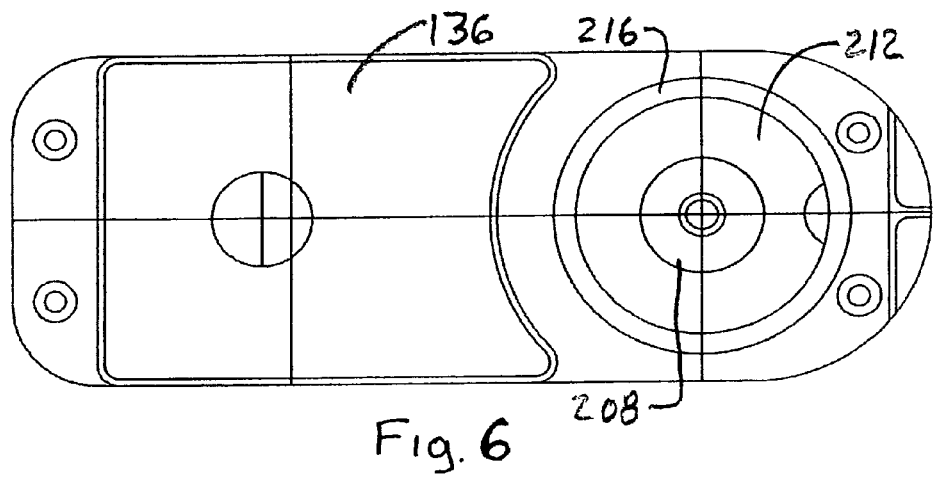
FIG. 6 is a plan view of the mixing chamber assembly of FIGS. 4 and 5.

As seen, an advantageous feature of the present invention is that there is that the solenoid controlled valve for closing off the outlet of the mixing chamber 34 during mixing that is used in known beverage mixing dispenser has been eliminated and thus the initial costs of such a solenoid and the cost of its control, maintenance and cleaning have also been eliminated. In addition, the elimination of the mixing chamber closure valve also eliminates another fixed connection that interferes with tooless removal of the mixing chamber assembly 34. Instead, the outlet of the mixing chamber 34 is freely open to the dispense tube 150 and to open end of the dispense tube, or nozzle 96. As seen in FIGS. 4-6, both the circular open top 134 of the upper cylindrical body and the circular open bottom are fully open. i.e. are without any inwardly projecting closure members that would block the free flow of the mixture through the mixing chamber, and are equal in size to each other and to the cylindrical side wall.

While the propellers are rotating at high speed, the mixing ingredient and beverage are generally maintained within the cylindrical body 130 due to centrifugal force rotating them and pressing them against the interior surface of the cylindrical body 130. The rate of falling downwardly toward the bottom 146 of the mixing chamber 34 and to inlet to the dispense tube 148 are reduced compared to the rate of falling without such centrifugal force. The degree that the bottom 146 slants downwardly is also selected to control the rate of flow out of the mixing chamber 34. In addition, the slanted bottom 148 and the presence of a centrally located, vertically extending, motor axle support boss 152, and a motor shaft connector fitting, slows the passage of the mixed beverage from the top side of the bottom 146 and the outlet. In the case of the dispense tube extending at a downward angle, as shown in FIG. 3, instead of being vertical, as shown in FIG. 4, the downward flow of beverage is relatively slowed.

The speed at which the beverage is dispensed from the mixing chamber 34 is also determined, in part, by an appropriate selection of the interior diameter of the dispense tube 148, with smaller diameters leading to slower flow than relatively larger diameters. The asymmetrical location of the outlet at the end of a bottom with a single sloping surface instead of a funnel shaped bottom also contributes to slowing the downward flow of the beverage.

In the preferred embodiment of the present invention shown in FIG. 7, it was found that a mixing chamber with a diameter of approximately two inches, a bottom downward angle relative to horizontal of approximately twenty-two radial degrees, a dispense tube interior diameter of approximately three-quarters of an inch and a downward angle, relative to horizontal, of approximately seventy-five radial degrees, worked very satisfactorily. The presence of the mixed beverage still within the mixing chamber and located beneath newly added ingredient inhibits downward migration of the un-mixed beverage still being spun around the interior surface of the mixing chamber 34 and limits the rate of the downward gravity flow of the mixed beverage within the mixing chamber 34. The downward slant of the bottom, or floor, 146 of the mixing chamber the propeller blades was found to result in a sufficiently slow downwardly flow rate to enable complete mixing of a one ounce cappuccino in approximately one second with a propeller speed as indicated herein. The parameters for other drink sizes, types of drinks and ingredients must be determined empirically.

Another advantageous feature of the dispenser 10 is that the connection between the motor and the propeller requires no tools for assembly or disassembly and employs no drive shaft bearing seals or the like. Elimination of the seals eliminates the increased costs of parts and assembly and repair of seals that become worn during use. As noted above, formed in the bottom 146 of the mixing chamber 34 is an upwardly extending motor axle boss 152 that is aligned with the mixing chamber center axis 52. The cylindrical sidewall of the support boss 152 is elongate and extends to an upper distal end 153, FIG. 5, located within the cylindrical upper body at a position that is substantially above the outlet opening 159 to the dispense tube 148. Protectively contained within but not supported within a cylindrical bore 155 of the boss 152 is the drive axle 154 of the motor 40. The motor 40 is permanently mounted within the housing 60 by means of a motor mounting plate 157 when in the operative position, as shown in FIG. 4, and there is no motor shaft bearing or the like to interfere with separation of the motor shaft from within the bore 155.

Advantageously, there is no internal seal between the motor shaft, or axle, 154 and the interior of the support boss 152 to interfere with disconnection or connection of the mixing chamber 34 from the motor 40 and motor shaft 154. Accordingly, such separation or connection may be accomplished without the use of any tools.

During assembly, the mixing chamber 34 is lowered through the opening between the rearward mounting member 136 and the forward mounting member 142 while the bottom of the bore of the boss 152 is lowered down around the drive axle, or motor drive shaft, 154 until the mounting members are engaged by the internal support frame 140. The drive axle 154 extends entirely through the bore from beneath the slanted bottom 146 and above the top of the boss 152. After the drive axle 154 has been fully inserted into the bore and is in the position shown in FIG. 4, a generally cup-shaped connector fitting, or releasable coupling, 156 is press-fit down onto the distal end 153 of the drive axle 154. At the end 153 is a radially outwardly and upwardly facing mating slot, or notch, 158 within which is slidably received an inwardly and downwardly extending mating detent 160. During assembly, after the mixing chamber body 34 has been lowered into the operative position, the releasable coupling 156 is lowered into position on the end of the drive axle 154 and the detent 160 is receive within the mating notch 158.

During rotation, the detent 158 bears against the notch 160 to insure that the connector fitting 156 is held to the axle against relative rotary movement. Accordingly, the connector fitting 156 rotates with, and at the same speed as, the rotating drive axle 154. During disassembly, the connector fitting is simply slid upwardly off the end 153 of the drive axle 154 without the need for any tools.

In keeping with another important aspect of the present invention, as generally noted, no O-ring seals or other seals between the drive axle 154 and the bore 155 of the boss 152 within which the axle is supported are required to prevent the passage of beverage through the bore between the inside surface of the bore 155 and the exterior surface of the motor drive shaft 154. Also, the motor 40 and its shaft 154 are supported solely by the mounting plate 157 and not by the bore 155, so there are no bearings to wear out or to interfere with separation of the mixing chamber 34 from the motor 40. Instead, as best seen in FIG. 5, the cup-shaped connector fitting 156, has a downwardly facing cavity 162 defined in part by a cylindrical skirt 164 that fits over the top of both the axle 154 and the boss 152 to block passage of beverage into the top of the bore 155. The downwardly facing cavity 162 has a relatively narrow, generally upper section within which the portion of the motor shaft 154 that extends above the top of the boss 152 is snuggly received and a lower, relatively wider cylindrical section within which an upper part of the boss 152 is snuggly received. Thus, the both the distal upper end of the shaft 154 and the top the boss 152 and the distal opening to the bore 155 are protectively covered both above and laterally against intrusion of beverage into the gap between the shaft 154 and the inside surface of the bore 155 by the fitting 156.

Still referring to FIGS. 4 and 5, the top of the connector fitting 156 carries a ferromagnetic element, or a magnetic element, 166. The propeller assembly 168 preferably carries a plurality of propeller blades, preferably at least two to four propeller blades, and as many as six to twelve propeller blades 36. Preferably, the configuration is that as shown and described with reference to FIG. 4. The propeller blades are planer and substantially vertical in orientation, but may be canted or of a different shape, but should, in any event, have a vertical portion that extends radially outwardly to a location adjacent to the plurality of fixed mixing members, or mixing ribs, 184. The propeller assembly also carries a ferromagnetic element, or a magnetic element, 170 that is magnetically adhered to the other element 166 when the two elements are pressed together. Accordingly, when the two elements 166 and 170 are in contact with each other, as best seen in FIG. 4, a releasable, rotary, magnetic linkage is created between the propeller assembly 168 and the connector fitting. Thus, when so linked, the propeller assembly 168 rotates with the rotation of the connector fitting 156. The connector fitting, in turn, as previously explained, rotates with rotation of the motor shaft 154.

The top part of the connector fitting 156 located above the cavity 162 has the shape of a truncated cone with a conical side 170 and a flat top 172 in which the magnetic element 166 is seated. The propeller assembly has a downwardly facing, mating, truncated conical cavity 174 with a flat, downwardly facing top 176 in which the magnetic element 170 is seated and a conical sidewall 178. The conical cavity 174 guides the conical top part of the connector fitting 156 into mating receipt within the cavity 174. When in mating receipt, the flat top 172 and the magnetic element 166 carried thereby are in engagement with the downwardly facing top 176 of the propeller assembly 168 and the magnetic element 166, respectively. In such, case the conical side 170 of the connector fitting 156 is pressed against the conical sidewall 178 to provide good lateral support while the mutual magnetic attraction of the elements 166 and 174 releasably interconnects the propeller assembly 168 for rotation with rotation of the connector fitting 156. Alternatively, an indent and mating slot is used to mechanically interconnect the connector fitting 156 to the propeller assembly 168 in a manner similar to the indent 160 and slot 158 interconnects the connector fitting to rotate with the rotation of the motor drive axle 154. Alternatively, the sides 170 and 178 are the planer triangular sides of a four-side pyramid or other mating configuration with a non-circular cross section to support the transmission of rotary torque between the connector member 156 and the propeller assembly 168.

The propeller assembly 168 has a plurality, preferably 6-12, of vertically, preferably downwardly extending, generally thin-walled, planer propeller blades 180 and 182 that extend into the upper part of the cylindrical body 130. Each of the blades 180 and 182 lie in planes that are generally parallel to, and intersect with, the center axis 132 and extend away from each other in radially opposite directions away from the center axis 132. The outer sides of the blades are straight and vertically aligned with the axis 52 and are generally parallel to the cylindrical sidewalls of the upper cylindrical section of the mixing chamber 34. The bottoms of the propeller blades have a concave, downwardly facing, preferably quarter-sectional circular, configurations, and blades that are directly opposite each other and which lie in the same plane define the shape of a semicircle, as shown in FIGS. 4 and 5.

Because of this blade configuration, the vertical thickness of the blades 180 and 184 are thickest adjacent the distal ends of the blades closest to the cylindrical wall of the mixing chamber 34. Since the linear velocity of the different portions of the blade extending from the center axis 52 is directly proportional to the distance of the portion from the center axis 52 and the axis of rotation, the distal, thickest ends have the highest linear velocity. The linear velocity of parts of the blade, thus decrease as the thickness of the blades decrease. The thickness decreases as a circular function while the speed reduces as a linear function. It has been found that with this blade configuration, the desired mixing is achieved within the time frame provided for mixing. While this propeller blade configuration is preferred, it should be appreciated that other configurations that perform the desired mixing function could also be used. For instance, the circular intermediate portion of the blade may be substituted by an intermediate blade section with an outward, linearly declining edge. Alternatively, the middle portion may be substantially eliminated so that there are only thin vertical legs located adjacent the innermost part of the fixed mixing members 184.

As noted above, the interior surface of the cylindrical upper part 130 of the mixing chamber is corrugated or otherwise roughened to facilitate agitation and mixing of water, steam, beverage ingredient and air. The corrugations have generally vertically oriented, elongate, radially inwardly extending fixed mixing elements, or ribs, 184 that are generally equally spaced around the interior surface of the cylindrical upper part 130 of the mixing chamber 34. There are preferably approximately sixteen to thirty-two mixing ribs, but no less than four rigs 184 and no more than approximately forty mixing ribs. Between adjacent mixing elements 184, the interior surface recedes outwardly away from the most inward extent of the mixing elements 184 the cylindrical surface. The cross section of the corrugations may have a square-wave, sinusoidal-wave or other like periodic varying configuration.

The peripheral mixing blades 180 and 182 have a straight vertical outer side 186, a relatively short bottom 188 and a semi-circular interior side 190. The outer sides 186 are spaced from the inner-most extent of the mixing elements 184 to provide a relatively narrow gap 192 between the mixing element 184 and the blades 180 and 182, as shown in FIG. 4. This gap 192 is preferably approximately $1/64^{th}$ to $1/32^{nd}$ inch. Another gap 194 substantially larger than the relatively narrow gap 192, preferably approximately $1/16$th inch, is formed between the outer sides 186 of the mixing blades and the outer most portions of the interior surface of the upper part 130 of the mixing chamber. The variation of the size of the gaps between the interior surface of the mixing chamber 34 and the blades 180 and 184 therefore varies between the width of the gap 92 and the width of the gap 94 as the blades rotate around the mixing chamber 34. This gap variation creates inward and outward movement of the ingredient, water, steam and air being mixed to facilitate mixing and creation of air bubbles, for creating a froth, such as in the case of a cappuccino being made. The ratio of the dimension of the narrow gap to the dimension of the wider gap is preferably approximately 1:4 to 1:2.

Above the peripheral mixing blades, is a central pre-mixing member 196 that is mounted symmetrically with respect to, and extends upwardly from the tops of the blades 180 and 184 along the center axis 132. The top of the pre-mixing member 198 preferably has a downwardly extending, arcuate, concave upper surface 199, a lower cylindrical section 203 and hemispherical section 201 located between the lower cylindrical section 203 and the concave upper surface 199. The pre-mixing member 196 is generally located opposite a water inlet opening 200 located at the end of a water feed tube 202 of an upper retainer and cover, or reflective cover, 204. The upper part 130 of the mixing chamber 34 has a nipple 206 with a water inlet passageway 208 that is aligned with the feed tube 202. Referring to FIG. 3, the water from the water tank 14 passes from a tank outlet 209 to an inlet 211 of a solenoid controlled water outlet valve 36 via a flexible hose 213. When the solenoid controlled valve 36 is open, the water flows through the valve and into the inlet of the water inlet passageway 208 via another flexible tube.

The reflective cover 204 has a concave, preferably spherically shaped, domed top 208 with an upwardly facing, circular, ingredient receipt opening 210 through which the ingredient is dropped into the mixing chamber 34. The central mixing blade 198 has a curved portion that conforms to the curvature of the domed top 208 to create a generally uniform gap 209 between the outer perimeter of the blade 198 and the interior surface of the domed top 208. The gap is approximately $1/4^{th}$ to $1/2$ inch.

During operation, as the water enters from the inlet 200, some of it engages the side of the rapidly rotating central pre-mixing member 198 and is spun off the side and into the interior surface of the domed top 208. The concave top 199 of the pre-mixing member 198 is beneath the top of the water inlet opening 200 and thus some of the water passes over the top 199 and washes off the ingredient that has been fed through the ingredient opening 210 and landed on the concave top 199. The ingredient is flushed and spun off the concave top 199 of the pre-mixing member and into the interior surface of the domed top 208 from which it is reflected inwardly and downwardly toward the blades 180 and 182. The pre-mixing member 198 in cooperation with the cover 204 thus imparts initial rotary and splashing movement to the water and the ingredient for pre-mixing before it is passed downwardly into contact with the propeller mixing blades 180 and 182.

As noted, the domed top 208 surrounding the opening 210 deflects any upwardly directed splashes both inwardly and downwardly. The cover 204 also has a truncated conical bottom 212 spaced above the blades 180 and 182 that is sloped outwardly and downwardly to deflect downwardly and inwardly any upwardly directed splashes from the ingredient and water passing into the corrugated portion of the mixing chamber upper body 130. This truncated conical body is also located above the bottom of the water inlet opening 200 and, thus, also deflects the water from the inlet opening 200 in a downward and inward direction toward the propeller blade and away from the ingredient opening 210 in the domed top 208.

The cover 204 has a cylindrical sidewall 214 that is snuggly received within the cylindrical upper part 130 of the mixing chamber body and is suspended in the location shown in FIG. 4 by an outwardly extending and downwardly turned perimeter collar 216 that fits over and is supported by the top edge of the of the cylindrical wall of the mixing chamber 34.

Advantageously, during assembly or disassembly the cover 204 is simply manually lowered into the operative position shown in FIG. 4 or manually raised out of this position without the use of any tools. Likewise, during disassembly or assembly, the propeller assembly is simply lowered into the position as shown in FIG. 4 or manually raised out of this operative position without the use of any tools. The pre-mixing member 198 is preferably used as a handle to grasp the propeller assembly in addition to performing its pre-mixing function. Because of the magnetic connection to the connector fitting 156 there is no need for tools. Likewise, during assembly or disassembly, the connector fitting 156 is manually lowered or raised off the end of the motor drive axle 154 without the use of any tools. During assembly or disassembly, after the hopper 12 is removed, the mixing chamber body may be simply manually lowered down onto or lifted off the axle 154 without the need or use of any tools and without concern for breaking any seals. The removal or installation of the mixing chamber body 130 may be performed with all of the other elements of the mixing chamber assembly attached to one another or they may be installed or removed one element at a time. In any event, once removed all the elements of the mixing chamber assembly 34 may be easily disassembled for cleaning, parts replacement or repair without the use of tools.

Referring now to FIGS. 3, 7, 8, 9 and 10, the hopper assembly 12 has a removable hopper body 220 with a generally rectangular open top 222, a cylindrical bottom section 224 and a rectilinear upper section 226 with a relatively narrow planer front wall 228 and back wall 230 of equal size. A relatively wider left side wall 232 and right side wall 234 of equal size are joined at their respective ends with the ends of the front wall 228 and the back wall 230. Carried by the bottom is a centrally located, elongated, generally cylindrical, screw-conveyor mounting tube 236 that extends in a forward-aft direction between an aft coupling-access opening 238 and a forward, ingredient outlet opening 240.

The top of the mounting tube 236 has an elongate, generally rectangular, upward facing, ingredient inlet opening 242. The width of the inlet opening is narrower than the width of the upper body section 220 and the bottom body section 228 has interior, inwardly tapered, generally planer, guide walls 244 and 246. The inwardly tapered walls 244 and 246 extend from the vertical left side walls 232 and 234, respectively, to opposite sides of the conveyor inlet opening 242 to guide the ingredient downwardly and inwardly toward and through the conveyor inlet opening 242. Likewise, the front 248 and bottom 250 of the cylindrical bottom on opposite sides of the front and back of the conveyor inlet opening 242 guide the ingredient downwardly and inwardly toward the front and back edges of the conveyor inlet opening 242.

Removably mounted within the conveyor mounting tube 242 is a feed-auger 252 with an elongate cylindrical body carrying an outwardly extending spiral screw thread 254 extending between a coupler 256 at the back and an outlet end 258 at the front. During assembly, the feed-auger is inserted though the conveyor outlet opening 240 and slid through the conveyor tube 236 until in a fully inserted position. In the fully inserted position, an outwardly extending collar 260 carried by the feed-auger 252 directly behind the coupler 256 is abutted against an inwardly extending shoulder 262 carried by the mounting tube 242 and located adjacent the coupler access opening 238. In this fully inserted position, the coupler 256 extends out of the mounting tube 242 rearwardly from the coupler access opening 238 and into releasable coupling relationship with a mating feed motor coupler 264, FIG. 3. The auger is completely supported within the conveyor tube by means of a pair of pillow blocks (not shown) at opposite ends of the shaft of the auger, or otherwise, and is not supported by the interior of the conveyor tube 236. The one of the pillow supports is carried by the removable down spout 270, FIG. 270. In the case of a powder mixing ingredient, the distal ends of the propeller blades do not even touch the interior surface of the conveyor tube.

The feed motor coupler 264 is connected to the drive shaft of a feed drive motor 266 and rotates with the drive shaft when the feed drive motor 268 is energized. As the auger 252 rotates, the ingredient that is held between the peaks of the screw threads is pushed along the length of the mounting tube 236 toward and out of the hopper outlet opening 240. The energizing of the feed motor 268 is controlled by the controller 16 to pass an appropriate quantity of ingredient out of the hopper outlet opening 240. Referring to FIGS. 11 and 12, after the feed-auger 252 has been installed into the conveyor mounting tube 236, an L-shaped downspout fitting 270 is force fit onto the end of the conveyor mounting tube 236 adjacent the outlet end 240 to redirect the ingredient downwardly. An outlet 272 of the downspout fitting 270 is located directly above the ingredient inlet opening 210 of the mixing chamber assembly 34 and the ingredient drops from the outlet opening 210, through the ingredient inlet opening 210 of the cover 204 directly into the mixing chamber body 130. The downspout fitting 270 also has a forwardly extending mounting member 274 that is releasably received through and supported within a mounting opening 276 in a forward downward extension 278 of the front wall 228.

In accordance with one feature of the present invention, the downspout fitting 270 is rotatably mounted to end of the mounting tube 236 adjacent the opening 240. When it is desired to remove the hopper 12 from the housing 60, the downspout fitting 270 is rotated so that the outlet 272 of the fitting 270 is facing upwardly to prevent any ingredient from falling out of the outlet 272. In addition, referring to FIG. 12, the outlet end 240 of the conveyor tube 236 may be provided with a has a fixed semi-circular closure plate 241 located within and above the center axis of the conveyor tube 236 that is aligned with and abutted against a like fixed semi-circular closure plate 271 at the inlet end of the ingredient down-spout fitting 270 when the fitting 270 has been rotated into the locked operative position in which it extends through the lock opening between floor members 138 and 144. In this operative position, the powder or other ingredient within the conveyor tube is not blocked and has free passage beneath the two semi-circular closure plates 241 and 27. However when the handle is used to turn the ingredient down-spout fitting to the inoperative, unlocked position to permit removal of the hopper assembly 12, the two closure plates 241 and 271 are located on opposite sides of the center axis to block passage of the ingredient out of the down-spout fitting 270. The downspout fitting 270 is kept in the inoperative, closed position during removal of the hopper 12 from outside of the housing 60. After the hopper has been remounted within the housing 60, the fitting is rotated back to the operative position as shown in FIGS. 3 and 7 to lock the hopper assembly 12 in place against lateral forces imposed by the rotating auger Referring to FIG. 7, a floor 271 of the mixing dispenser has an elongate, interlock opening 281 into and through which the downward directed portion 275 is pivoted after being placed into the operative position. In this operative position, the L-shaped down tube 28 is locked onto the end of the conveyor tube 236 and the hopper 12 with which it is integrally formed are prevented from moving laterally. This locks the auger 252 in engagement with the coupler 264 and laterally secures the hopper against any lateral movement due to any torque-forces that may be created by the turning of the auger and rotation of the agitation member 280.

As best seen in FIG. 7, the hopper 12 has a front wall 271 with a mounting hole 273 within which is mounted a shaft 275. On the outside of the front wall 271, the shaft 275 is mounted to a handle 277, and on the inside of the front wall the shaft is connected via an intermediate member 279 to the forward facing side of the downspout fitting 28. Rotation of the handle 277, rotates the downspout fitting 270 into and out of locking engagement with the latch opening 281. After the downspout fitting is moved to the up, or inoperative, unlocked position, the hopper 12 may be lifted out of the housing 60 of the mixing dispenser 10. The top cover 233 is preferably hinged to the open top of the housing or is otherwise removable to be moved between an open position to permit removal and insertion of the hopper 12, etc. and a closed position. In the closed position the open top 22 of the hopper 12 is also closed. After removal of the hopper 12 from the housing 60, the down-spout fitting 28 may be laterally slid of the end of the conveyor tube 236 by manual, tool-less means without the use of tools by simply manually pulling the downspout fitting 270 off of the end of the conveyor tube. After removal of the downspout 28 the male coupler 256 is laterally slid out of mating association with the coupler 264 and slide out of the distal end 240 of the conveyor tube body 236, again, manually and without the use of tools. This removal may be done for purposes of cleaning, repair, replacement or substitution of a different type of auger, such as one adapted to semi-liquid beverage ingredient.

After the hopper assembly 12 is removed from the housing, the cover 142 may be manually removed without the use of tools simply by lifting it vertically off its support at 144. The mixing chamber assembly 34 may then be manually, vertically lifted out of the mounting opening located between the floor segments 138 and 144 until the propeller assembly is disconnected from the motor drive shaft 154 and then tilted slightly to clear the beverage outlet tube 96 through the mounting opening.

Figure 14:
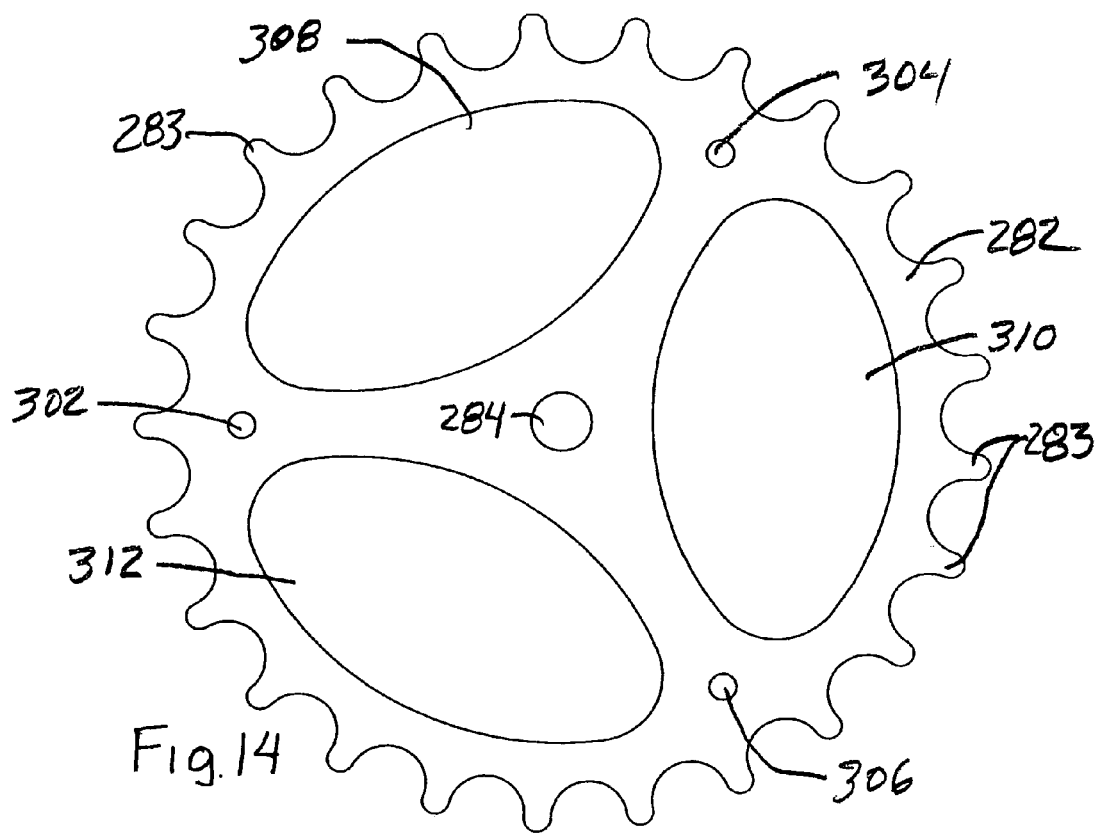
FIG. 14 is a side view of the agitator, or mixing, wheel that is received within the hopper storage body.
Figure 15:
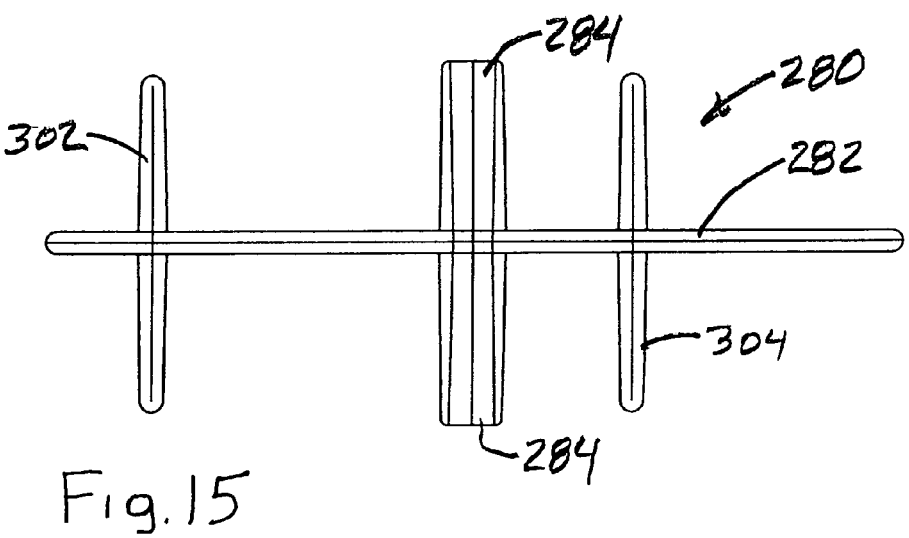
FIG. 15 is a plan view of the mixing wheel showing the outrigger supports for maintaining proper alignment of the mixing wheel within the hopper storage body.

Referring to FIGS. 8, 14 and 1 releasably mounted within the hopper body is an agitation member 280 for keeping the ingredient mixed and free flowing downwardly during a beverage making cycle. In accordance with one aspect of the invention, the agitation member 280 is driven by the same motor 268 that is used to drive the feed-auger 252. Preferably, the agitation member 280 has a generally circular disc-shaped body 282 that carries gear teeth 283 around its circumference that mesh with the spiral gear teeth of the feed-auger 252 when the agitator member 280 is installed into the hopper body 220. The agitator body 282 has a pair of central axle stubs 284 that extend outwardly from opposite sides of the body 282. Carried on the inside of the hopper body 220 on opposite sides and facing inwardly toward each other are a pair of substantially identical agitator mounting members 290 that releasably support the axle stubs 284 in operative position. Each of the mounting members has an arcuate hooked portion 296 that faces generally rearwardly and an elongate, generally straight guide member 298 that slants downwardly and rearwardly from a location above the top of the cylindrical bottom 228 to a location rearward of the central axis 300 and beneath the top of the cylindrical bottom 228.

The agitation member 280 also has three pair of agitation arms 302, 304 and 306 that extend outwardly on opposite side of the disc body. These agitation arms pass through the ingredient in the hopper during the rotation of the agitation member 280 to mix the ingredient. In addition, these arms extend outwardly distal ends by a sufficient amount to engage the interior surface of the hopper body 220 to assist in maintaining the agitation member 280 in an upright and properly aligned position within the hopper body 220. Three generally oval-shaped openings through the disc body 282 have internal edges that also pass through and agitate the ingredient during rotation of the disc body 282

During installation of the agitation member 280, it is simply manually lowered through the open top 222 of the hopper body 220. Once the axle stubs 284 engage the guide sections 230 of the mounting, they slide down and past the guide sections 230 to a location rearward of and directly opposite the curved section 286 of the mounting member 290 and with the gear teeth 283 resting upon teeth of the feed-auger 252. Once the feed-auger begins to rotate, if engagement with the teeth 283 of the agitation member 280 causes the agitation member 280 to move forwardly until the axle stubs are engaged by and laterally and partially vertically supported by the arcuate section 286 of the mounting member 290. The inwardly downwardly slanted walls 244 and 246, FIG. 10, also function to guide the agitation member into proper alignment within the hopper body.

If the teeth are not already meshing when the agitation member is installed and before rotation has begun, the first rotation of the feed-auger 252 and resultant forward movement of the agitation member relative to the feed-auger will result in automatic self-alignment and meshing of the feed auger teeth with the agitation member teeth.

Again, it is seen that the installation requires no tools. Likewise, removal of the agitation member is achieved by manually moving the agitation member 280 rearwardly until clearance away from beneath the overhanging portion of the arcuate section of the mounting member and lower most portion of the guide section 290 is achieved and then simply lifting the agitation member through the open top 222 and out of the hopper body 220.

Likewise, the entire hopper body 220 may be removed without the use of tools. This is done by first simply turning the downspout 270 to the upwardly facing closed position using the handle 277, disconnecting the auger 252 connector 256 from the motor coupler 257 and then simply lifting the entire hopper body with agitation member and auger attached out through the open top of the housing 60. If desired, the auger may be removed by sliding the auger 252 forwardly from the mounting tube 236 through the outlet end after the hopper body 220 has been lifted out through the top of the housing 60 after a pivotally mounted cover 292 is opened to permit the removal.

While a particular mixing dispenser that embodies the invention has been disclosed in detail the scope of the invention is not limited by such details but is defined by the appended claims to which reference should be made to determine the scope of the invention.

The invention claimed is:

1. In a mixing drink dispenser having a source of water for mixing with a beverage ingredient to make a drink, the improvement being a mixing assembly, comprising:
   a mixing chamber assembly having
      a mixing chamber with an upper cylindrical section for receipt of beverage ingredient and water and a cylindrical lower section vertically aligned directly beneath the upper section and joined to and in open fluid communication with the upper section,
      the upper cylindrical section having a fully open top for receipt of beverage ingredient, a water inlet for receipt of water from the source and a fully open bottom,
      the cylindrical lower section having the fully open top aligned and coextensive with the fully open bottom of the upper section, and a bottom with a non-closable beverage outlet in the bottom for free, unobstructed passage of freshly mixed beverage out of the mixing chamber to a beverage container; and a mixing propeller assembly with a plurality of mixing propellers mounted for rotation about a vertical axis centrally aligned directly beneath the upper section and located within the lower section intermediate the upper section and the non-closable beverage outlet, said mixing propellers mixing together the beverage ingredient and water received at the upper section while falling through the cylindrical lower section but before falling to the bottom of the lower section and the non-closable beverage outlet and passing out of the mixing chamber, said bottom of the lower section being located beneath the propellers.

2. The mixing drink dispenser of claim 1 including an elongate tubular non-closable nozzle connected to the non-closable beverage outlet and extending downwardly to a distal end with a nozzle outlet located beneath the bottom of the lower section in one of (a) a substantially vertical direction, and (2) a direction slanted relative to vertical.

3. The mixing drink dispenser of claim 1 in which the bottom is substantially planer and extends substantially continuously downward from a highest side to an opposite lowest side at which the non-closable beverage outlet is located.

4. The beverage mixing dispenser of claim 1 including a domed cover to the open top releasably mounted to the upper section and having an upwardly facing ingredient inlet opening of a size reduced relative to the open top of the upper section.

5. The beverage mixing dispenser of claim 1 including a cover to the open top with an upwardly facing ingredient opening and an inwardly extending inlet tube for passing water from the water inlet of the upper section to an interior location in the upper section.

6. In a mixing drink dispenser having a frame, source of water, a hopper for storing a supply of beverage ingredient, means for feeding selected amounts of beverage ingredient and water together for mixing, the improvement being a mixing chamber assembly, comprising:

a mixing chamber body with an upper cylindrical section with an open top for receipt of beverage ingredient and a cylindrical interior side with a central axis of symmetry and a water inlet for connection of the upper section with the source of water, a lower cylindrical section with a central axis of symmetry aligned with the central axis of symmetry of the upper cylindrical section connected to and in free fluid communication with the upper section, said lower section having an interior cylindrical surface substantially continuous with the cylindrical interior side and fixed mixing members spaced around and extending inwardly from the interior cylindrical surface, and a bottom with a beverage outlet located beneath the lower cylindrical section: and a propeller assembly mounted for rotation within the lower cylindrical section around an axis that is substantially aligned with the central axis of symmetry of the lower cylindrical section and of the cylindrical upper section and having at least one radially extending mixing propeller that extends outwardly to adjacent the inwardly extending fixed mixing members.

7. The mixing drink dispenser of claim 6 in which the fixed mixing members are one of (1) cylindrical, and (2) sinusoidal in shape.

8. The mixing drink dispenser of claim 6 in which the fixed mixing members are evenly spaced around the interior cylindrical surface.

9. The mixing drink dispenser of claim 6 in which the fixed mixing members are elongate and extend in a direction substantially parallel to the central axis of symmetry.

10. The mixing drink dispenser of claim 6 in which the propellers have outermost edges that are located adjacent to innermost part of the fixed mixing members.

11. The mixing drink dispenser of claim 6 in which the fixed mixing members are elongate and substantially straight and the propellers have elongate relatively straight other edges that are substantially parallel to the elongate fixed mixing members.

12. In a mixing drink dispenser having a frame, source of water, a hopper for storing a supply of beverage ingredient, means for feeding selected amounts of beverage ingredient and water together for mixing, the improvement being a mixing chamber assembly, comprising:

a mixing chamber body with an upper cylindrical section with an open top and a cylindrical side with a water inlet for connection of the upper section with the source of water, a lower cylindrical section with a central axis of symmetry connected to and in free fluid communication with the upper section, said lower section having an interior cylindrical surface substantially continuous with the cylindrical interior side, a bottom with a beverage outlet located beneath the lower cylindrical section, and a propeller assembly mounted for rotation within the lower cylindrical section around an axis that is substantially parallel to the central axis of symmetry of the lower cylindrical section and having at least one radially extending, peripheral, mixing propeller and a central pre-mixing member aligned with the central axis of symmetry, said central pre-mixing member being located above the at least one radially extending mixing propeller and directly laterally opposite at least a portion of the water inlet.

13. In a mixing drink dispenser having a frame, source of water, a hopper for storing a supply of beverage ingredient, means for feeding selected amounts of beverage ingredient and water together for mixing, the improvement being a mixing chamber assembly, comprising:

a mixing chamber body with an upper cylindrical section with an open top and a cylindrical side with a water inlet for connection of the upper section with the source of water, a lower cylindrical section with a central axis of symmetry connected to and in free fluid communication with the upper section, said lower section having an interior cylindrical surface substantially continuous with the cylindrical interior side, a bottom with a beverage outlet located beneath the lower cylindrical section;

a propeller assembly mounted for rotation within the lower cylindrical section around an axis that is substantially parallel to the central axis of symmetry of the lower cylindrical section and having at least one radially extending, peripheral, mixing propeller; and a cover with a downwardly facing concave interior surface and a central ingredient inlet opening for receipt of beverage ingredient mounted to the upper section and above the mixing propeller to reflect downwardly and inwardly any upwardly directed splashes from the propeller assembly or the water inlet.

14. The mixing drink dispenser of claim 13 in which the downwardly facing concave surface is substantially spherical.

15. The mixing drink dispenser of claim 13 in which the cover includes a bottom with a downwardly facing truncated conical surface surrounding and joined with a lower part of the downwardly facing concave surface.

16. The mixing drink dispenser of claim 13 in which the central ingredient opening is substantially smaller than the open top of the upper section of the mixing chamber body.

17. The mixing drink dispenser of claim 13 in which the cover includes a cylindrical side wall with a water inlet pipe extending radially inwardly to a side of the concave interior surface.

18. The mixing drink dispenser of claim 13 in which the including means for releasably mounting the cover within the upper section and beneath the open top.

* * * * *